(12) United States Patent
Zdenek

(10) Patent No.: US 12,238,379 B2
(45) Date of Patent: Feb. 25, 2025

(54) DETERMINING A DISTRIBUTION OF DIGITAL CONTENT USING INFORMATION ASSOCIATED WITH THE SUBMISSION OF QUESTIONS, ANSWERS AND RATINGS

(71) Applicant: Andrew Zdenek, Robbinsville, NJ (US)

(72) Inventor: Andrew Zdenek, Robbinsville, NJ (US)

( * ) Notice: Subject to any disclaimer, the term of this patent is extended or adjusted under 35 U.S.C. 154(b) by 52 days.

(21) Appl. No.: 18/146,374

(22) Filed: Dec. 24, 2022

(65) Prior Publication Data

US 2024/0214642 A1   Jun. 27, 2024

(51) Int. Cl.
*H04N 21/475* (2011.01)
*H04N 21/258* (2011.01)

(52) U.S. Cl.
CPC ....... *H04N 21/4756* (2013.01); *H04N 21/258* (2013.01)

(58) Field of Classification Search
CPC .......................... H04N 21/4756; H04N 21/258
See application file for complete search history.

(56) References Cited

U.S. PATENT DOCUMENTS

| | | | |
|---|---|---|---|
| 6,288,753 B1 * | 9/2001 | DeNicola | H04N 7/147 |
| | | | 348/14.07 |
| 10,332,137 B2 * | 6/2019 | Noelting | G06Q 30/0204 |
| 2015/0006261 A1 * | 1/2015 | Gutman | G06F 3/0482 |
| | | | 705/7.39 |

* cited by examiner

*Primary Examiner* — Adil Ocak

(57) ABSTRACT

Determining a distribution of digital content using information associated with the submission of questions, answers and ratings to optimize user participation and content distribution. Users can create and submit content including questions and answers for distribution to other users. The system uses information including whether or not answers provided by a user are accepted by other users and the alignment of a user's ratings with the ratings provided by other users for the same answers to determine how widely to distribute the content submitted by an individual user.

12 Claims, No Drawings

DETERMINING A DISTRIBUTION OF DIGITAL CONTENT USING INFORMATION ASSOCIATED WITH THE SUBMISSION OF QUESTIONS, ANSWERS AND RATINGS

CROSS-REFERENCE TO RELATED APPLICATIONS

Provisional Patent Application: 63/304,685 Filed: Jan. 30, 2022

BACKGROUND OF THE INVENTION

The present invention involves a method and system embodied as computer software. Its field corresponds with platforms that allow users to communicate and share information such as social media platforms, social networking systems, and online question and answer forums.

The two main categories of related art are online social media and question and answer platforms or forums. Existing social media platforms have a problem with content containing false or mis-information being widely distributed through their use. A main reason for this problem is that the metrics used by these systems to determine how widely to distribute content are based on interactions from users without any indication of the level of understanding that these users have of the subject matter they are providing feedback for. This problem is worsened by the fact that the type of user interactions these platforms use for determining user sentiment towards content involve simple actions that require little cognitive effort. This simple nature makes these interactions easy for software to emulate as a means of artificially influencing the apparent popularity of some content in an effort to increase its distribution. Existing online question and answer forums provide a good source of valuable information to users, but require users to actively search though often large amounts of information to provide answers or other feedback. These also tend to be fragmented into different areas meaning the user asking questions has to decide on a specific area on the platform to submit their question. This type of environment might be suitable for some users, but other users would welcome a system that performs some of this decision making for them, based on their settings and historical usage, thus allowing them to focus instead on creating content and providing valuable feedback with less overall effort.

SUMMARY OF THE INVENTION

The present invention shares characteristics of both of the previously mentioned related platform types having features for sharing of information with users, the ability to ask questions and provide answers, and the ability to provide feedback on the responses from other users. However, the present invention provides novel methods that encourage user participation which in turn promotes a source of peer reviewed answers to questions. The system establishes the users' demonstrated level of knowledge in given topics based on the evaluation of tasks which include answering questions, receiving ratings for those answers, and conducting reviews of answers. The system then uses this information for determining how widely to distribute a user's content to other users of the system. These types of user interactions require more cognitive effort which is harder to emulate using software, making it more difficult to artificially influence the distribution of the content. These methods are useful for ensuring that a higher quality of content is distributed to users and increasing their confidence in the information they receive from the system. The established knowledge information is also used by the system to identify the users who are most capable of providing quality answers to the questions associated with those topics. This allows the questions to be distributed to the users which are most likely to be able to provide the highest quality responses earlier than to other users.

The structure of the system processes and the user interactions reduces the amount of work required for users to participate through the system compared to existing platforms. For instance, the system maintains information regarding the topics that a user has indicated an interest for or provided answers or reviews to questions and answers associated with those topics. This information is used to derive a measure of a user's understanding or knowledge of the topics which is then used to distribute additional tasks in an order that optimizes the benefit for both the individual user and the entire system. This removes the need for the user to read through large amounts of information on a platform and make decisions about potential ways to participate. In addition, having the actual scheduling order of each task and the historical usage patterns of the users available for the system to evaluate provides further opportunities to use methods such as predictive analytics, modeling, and machine learning to optimize the overall work throughput of the system.

When users participate in the system and provide accepted answers or majority aligned ratings they are benefited by receiving a greater range of distribution for the content that they then create and submit. The result is that users have an incentive and therefore are motivated to provide higher quality responses for their own benefit. This increased motivation provides a benefit to the users seeking answers, which in turn promotes further participation and benefits the system as a whole.

DETAILED DESCRIPTION OF THE INVENTION

At a high level the present invention can be viewed as a software based system, with a specific embodiment comprising some number of separate server components and client components. Individual embodiments may be implemented using different software architectural designs that apply various quantities of different types of components. For the current embodiment, the design will be described using a server component which communicates with a plurality of separate client components over a network such as the internet. A server component is typically responsible for the execution of system processes while the client components typically provide a means for the users to interact with the system. The server components can run on one or more computing devices and the client components are native or browser based applications running on mobile or desktop computing devices. The communication between server component and client components can be implemented using common networking protocols such as HTTP or RPC over TCP. The phrase distribution of content is used to describe the sharing of information among users through the availability of that information provided to individual users by the system. The distribution of content involves the transmission of the data between two or more components across a network. This transmission can be initiated in a variety of ways such as, a client component sending a request for content to a server component, the server component in response, locating the requested content, determining the availability of the requested content for that user, and responding with a message containing that content data when it's determined to be available for that user. Alternatively, a server component could initiate a message containing some content data determined to be available for a user and send the message through a previously established network connection with a client component in use by that user. Other methods include direct message passing between two or more separate client components over the network. Such methods for sharing information are widely used by existing computer networking systems but are described to establish context for the current embodiment.

Within the system a user creates a user account which is used by the system to record information about that specific user. The user account records information such as a user name, user description, profile image, and credentials for gaining access to the system as well a unique user account identifier. The user account identifier can be the user name or some other unique identifier and is associated with the content submitted by the user and other data corresponding to their usage of the system. Portions of the user account may be made available for display to other users of the system such as the user name, user description, profile image, and certain usage data, such information is commonly referred to as a user profile. The user account can also store a user's external contact information such as a third party email address used to verify a user or communicate with a user outside of the system features. The term user is used to refer to both a user interacting with the system and a user associated with a user account.

Users of the system can choose one or more other users to receive content from when those other users submit content. Such methods of indicating an interest to receive a user's content are widely used in existing platforms. The present embodiment also includes the concept of groups which are logical collections of users. The system defines a system wide group accessible by all users referred to as the public group which contains all users of the system. A user can also create their own private groups from the list of users who have selected to receive posts from them. Each group can be assigned a name allowing the user to distinguish between individual groups. The user can also add users who they have chosen to receive content from to their private groups, allowing the users to organize the content they receive. In addition to the content the tasks that the user receives are also organized into the public or private groups. Tasks are further described in subsequent paragraphs. Since private groups are a subset of the public group the system will choose to associate content and tasks with one or more private groups as well as the public group when the content originates from a user that has been added to those private groups. The system allows the user to add the same user to more than one private group. The current embodiment associates content and tasks that originate from a user with each group that user belongs to including the public group. The user interface displays information to the user indicating which of the users they are receiving content from and which of the users are receiving content from them in each group. Both the public and private groups play a role in how the different forms of information are distributed within the system which will be described in more detail. Although some of the details presented here are specific to the invention, the basic methods of defining collections of users are common among information sharing platforms.

Within the system the users can create and submit different types of information referred to as content. The content is comprised of one or more of the following which can be submitted separately or together as a single unit of content text data, file data such as images or documents, and data encoded for audio and video media. There are different specific types of content referred to as posts, questions and answers which will be described in more detail in the following sections. Users use the client components to create and submit content. Features for capturing user input and recording various forms of media are commonly available through existing application development platforms. These available features are used by the current embodiment to provide a means for the user to obtain various parts of the content directly while operating the application or by attaching existing file data from a local or network file system.

All types of the content can optionally include one or more topics associated with that content. Topics consist of a word or a series of words that identify a category for the content such as food, health, or sports. The topics do not have to conform to a fixed set of values or have a particular level of specificity; they can be either broad or narrow. Topics can be associated with content in the following ways. A user can include one or more hashtags for each topic they would like to associate with the content as they create it. A hashtag is a string of text characters starting with the hash or pound sign and typically having the first letter of each separate word capitalized and no spaces. The hashtag is a common construct that is easily recognized by its first character when embedded within separate text. Hashtags are commonly used in software applications to indicate a topic, a category or an affiliation associated with some content. Additionally, the system can use known natural language processing and machine learning techniques to derive the topics through direct analysis and interpretation of the content.

The users can define and maintain their own list of topics to indicate an interest in receiving content from other users when that content is associated with those topics. Such a list of topics is referred to as the user's interest. Some embodiments could allow a user to further define the interest by assigned a specific weight values to each interest topic. A greater weight value for an interest topic would indicate that the user has a higher level of interest in that topic. The system can evaluate a user's interest when determining which content to distribute to that user. Further details concerning the use of the users' interest will be discussed in the following sections. In addition, the system can derive topics which appear to be interests of the users through evaluating the topics associated with the content that each user interacts with during use of the system. The concepts surrounding topics and their use with information sharing platforms are widely used, but their definitions are established to describe their association with the novel features of the system.

Users can create and submit a specific type of content in the form of a question to the system. Since the questions are a specific type of content, they can be associated with topics. There is no need for the user to determine a specific location or address to send the questions to. The user interface of the client component allows the user to simply create the content and submit it as a question, allowing the system to manage the content's distribution using information including the topics associated with the question. The system records the user account identifier of the user account in use by the user that submitted the question along with the question to maintain an association between that user and the question. However, the current embodiment allows a user the choice of either remaining anonymous, in which case the user profile associated with the user's account is not displayed to other users who receive the question, or allowing their user profile to be displayed to the users who receive the question. The term anonymous, as used here, refers to the fact that other users do not receive user profile information about the user, however, the system still retains the user account identifier associated with the content and user actions. The user can choose whether or not to remain anonymous for each individual question they submit, meaning each time they submit a question they can choose whether or not to display their user profile to other users or remain anonymous for that particular question. An exception would be when a user is operating in restricted minor mode in which case a question they submit to the public group is always anonymous. Restricted minor mode is further described in a subsequent paragraph. When a question is submitted to the system a response task is created for that question. The details of tasks are described in the following section.

Certain user actions within the system result in the system generating a task. Within the current embodiment, a task is used to record information pertaining to a request for information from users in response to a prior user action. The prior user actions that result in tasks are either a question or an answer being submitted. A task resulting from the submission of a question is referred to as a response task while a task resulting from the submission of an answer is referred to as a review task. A task is also associated with a set of topics referred to as the task topics. The task topics are derived from the topics of the content associated with the action that resulted in the task. For example, the task topics for response tasks are the set of topics associated with the question that was submitted resulting in that response task, while the task topics for review tasks are the set of topics associated with the original question as well as the set of topics associated with the answer that was submitted resulting in that review task. The task topics are used to prioritize scheduling of tasks for users which is described in a subsequent paragraph concerning task scheduling.

When the system receives a question it generates response tasks to distribute the question to separate users who can then respond with answers. When a user receives a response task from the system they can create and submit a specific type of content referred to as an answer in response to that task. Since the answers are a specific type of content they can be associated with topics. When receiving a response task users also have the option to skip the task in which case they do not submit an answer for that task. When a user submits an answer the system records a user account identifier for the user account of the user submitting the answer along with the answer. However, the current embodiment allows the users to submit the answer anonymously, in which case the user profile is not displayed to other users of the system who receive the answer, or they can choose to allow their user profile to be displayed to the users receiving the answer. As with the questions, the user can choose whether or not to display user profile or remain anonymous for each individual response task. An embodiment could also include a means for the answering user to indicate a level of certainty they have about the accuracy of their answer in response to the question. This would allow a user to indicate to other users and the system that they have determined that their answer falls in some range of likelihood of being correct. Additional uses of the certainty will be described in subsequent paragraphs.

The system creates review tasks in response to receiving an answer and distributes the original question and answers that resulted in the review task to a set of users for review. The users who receive the review task can review the question and answer and provide either positive or negative rating as a response to the review task. This rating indicates whether they consider the answer to be of sufficient correctness and quality in response to the question. The current embodiment uses a simple binary rating to indicate either agreement or disagreement with the answer. However, a different embodiment could use a more complex rating system such as a relative comparison between multiple answers, or a scale based rating. In addition to the rating, the current embodiment also provides an option for the reviewing user to flag the answer as inappropriate or invalid. The number or percentage of responses with a flag value received for a specific answer can be evaluated by the system and if at some point this amount reaches a certain threshold then the system can automatically reject that answer. A rating that a user provides in response to a review tasks is referred to as a vote. As with response tasks, the users are also given the option to skip the review task in which case they choose not to provide any rating for that answer. Some embodiments may also provide a means for a reviewing user to include a certainty level with the response tasks serving the same purpose as is it does with the response tasks of indicating their perceived level of correctness in their response. When a user submits a vote the system records the user account identifier along with the vote, however the current embodiment allows the users to select an option to remain anonymous in which case other users do not see their user profile associated with the vote. As with submitting questions or answers for response tasks, the user has the option to remain anonymous or include their user profile for each individual review task they respond to.

Some embodiments may also include the ability for a user responding to review tasks to add comments regarding the answer. Such comments would typically include suggestions on how to improve the answer or adjust the topics that have been included with the answer to improve overall correctness or quality. When a user adds comments to the review task and submits the response, the system would distribute the comments to the user that provided the answer associated with that review task. When the answering user receives the comments they are allowed to edit the original answer they provided and re-submit the answer. The answering user is also giving the ability to add their own comments to further explain their reasoning for the answer and included topics. After the answer is re-submitted the system distributes the potentially modified answer along with any comments the answering user provided back to the user that submitted the comments during the review for further review. This comment and review process can continue until the user providing the review decides to submit a rating for the answer.

The system evaluates the ratings of the votes to create an ordering of the set of answers associated with the same question and establish a list of one or more accepted answers. The system can use different approaches for determining when to begin ordering and selecting the accepted answers. These can include beginning the process after a certain number of review task responses are received, or when the total knowledge level for the task topics of the users that provided the answer and the users that responded to the review tasks so far reaches a certain level. An embodiment that includes the option for users to include a certainty with either the response or review tasks may also factor the certainty levels into the formula for ordering the answers. This would be accomplished by giving greater weight to answers and votes from users having higher levels of certainty as well as higher levels of knowledge. After an ordering is established for one or more accepted answers they are distributed to one or more users including the user who submitted the question. Some embodiments may continue to distribute a question and it's associated tasks after the accepted ordering is established. This continuation may be contingent upon the overall workload pending at a given time. In the case when the system continues the process, the system could continue to distribute and evaluate response and review tasks to determine if any newer answers receive a higher rating then the previously accepted answer or answers. If new higher rated answers are found the system may distribute these answers to users including the user who submitted the original question. This would allow the users to get a quick answer to their questions, and then potentially receive higher rated answers later.

The system records a value associated with a specific user and topic referred to as knowledge. The system derives the values of the knowledge based on the responses users provide to tasks. Within the current embodiment a user's knowledge is influenced in the following ways. When a user submits an answer and that answer is subsequently accepted, the user's knowledge for the topics associated with the question and the answer is increased. However, if the user provides an answer that is not accepted, the knowledge associated with the same topics is decreased. In addition, when a user submits a rating in response to a review task which aligns with the majority of ratings received from review tasks for the same answer the user's knowledge for the topics associated with the question and answer that resulted in the review task is increased. When the user's rating aligns with the minority of the ratings of the responses received for those review tasks then the same knowledge is decreased. The information used to determine the majority rating for a set of votes may be based on a simple count of votes or a weighted value where the weight of each vote correlates to the knowledge of the user who submitted the vote. This means the majority aligned rating may be considered to be the rating that has the highest cumulative knowledge for the task topics which may or may not be the rating that received the most individual user votes. The knowledge is used by a variety of processes within the system which are described in the following sections.

The actual amount of change applied to the knowledge may differ for different tasks and circumstances. For example, the current embodiment applies a greater increase in knowledge for providing an accepted answer as compared to providing a majority aligned vote. In addition, some embodiments might evaluate the existing knowledge level of the users participating in the set of tasks associated with a question and answer to determine the amount of change to apply to each user's knowledge who participated in the related tasks. For example, if a user's response to a task aligns with users having a higher knowledge of the topics this might result in a greater magnitude of change to their knowledge compared to alignment with users having lower knowledge of the same topics. An embodiment that allows users to include a certainty level when responding to tasks may also use this value for adjusting the knowledge. For example, if a user submits an answer with a higher certainty value and that answer is not accepted the decrease in knowledge might be greater than if the user submitted the same answer with a lower certainty level. If however, a user submits an answer with a higher certainty value and the answer is accepted their knowledge would be increased more than if they had submitted the same answer with a lower certainty value. The same correlation would hold for alignment of votes. Votes submitted with a higher certainty level that align with the majority would result in a greater increase in knowledge than the same vote with lower certainty and votes submitted with a higher certainty that do not align with the majority would result in a greater decrease in knowledge than the same vote with less certainty. The use of certainty may promote participation by allowing users a means of hedging the amount of risk to their knowledge values based on their own assessment toward the accuracy of their responses.

Another factor that can be used by an embodiment to adjust a user's knowledge value is the user's task response time. The user's task response time is the length of time between when a task is submitted to a user and when the user responds. An increased knowledge may be applied for users who respond to the tasks faster. This provides an incentive for faster task responses decreasing the overall length of time needed to establish the accepted answers.

The current embodiment of the system maintains a separate set of knowledge values associated with a user for each group the user participates through. For example, A user's knowledge may have a particular value in a private group, and a completely different value in the public group or a separate private group. This prevents users from building knowledge among a small set of users in one group and then carrying that knowledge over to a separate and potentially larger group such as the public group. Although, the knowledge values may be maintained separately for each group the system can still use this information across groups for certain purposes. For example, the system might use the total knowledge across all or multiple groups for task prioritization, but only the knowledge established within the current group for purposes of reach distribution within that group. Reach distribution is described in a subsequent section.

The system maintains a specific ordering of tasks assigned to the users. The current embodiment, orders the tasks based on the total sum of the user's knowledge for the set of topics belonging to the task topics. This approach is implemented by adding tasks to a separate priority queue associated with each user to maintain the task ordering for that particular user. A priority queue is a widely used data structure that provides an efficient means of partial ordering by maintaining an invariant where the first item of the collection remains the item with the most significant value as items are added and removed from the collection. The current embodiment of the system distributes a single task at a time to a user by removing the task from the first position of that user's priority queue and sending that task to the user. This ensures that the tasks most closely aligned with a user's demonstrated knowledge are distributed earlier than other tasks for that user. The current embodiment of the system defers sending additional tasks to a user until the user responds to any previously sent task. This simplifies the decision making process for the user allowing them to focus on a single tasks at a time and provides the system more opportunities for optimizing the scheduling tasks. If at some point prior to being sent to a user a task is invalidated then the task can be marked as such and the system can either remove that task from any of the users' priority queues that contain it or discard it prior to it being sent to a user. If a user has already been sent a task that is subsequently invalidated, the system can ignore any responses the user provides for that task or use it for limited purposes. For example, if a user submits a response to a task for a question that has already received an accepted answer that task may not be used for determining the accepted answer, but the users response can still be compared with the majority to adjust that user's knowledge. In addition, some embodiments may continue to distribute tasks for questions that have been answered and to determine if a newer answer with a higher rating is received. Such an embodiment could determine whether or not to keep distributing tasks for an answered question and for how long based on the overall pending workload available to users.

In addition to the users' knowledge, the system can use other information to control the scheduling of task distribution to users. Such information can include a measurement of the length of time that the set of tasks corresponding to a specific question or answer have been pending without obtaining acceptable responses. For example, if a set of tasks associated with a given question have not received an answer for a specific length of time those tasks may be reprioritized within the system to attempt to decrease the response time for those tasks. The same reprioritization could be applied to review tasks. Such reprioritizations provide the system a method for maintaining a level of liveliness of the task responses. In addition, some embodiments might consider the group which is associated with the content that results in the tasks for prioritizing the tasks. For instance, a task that results from content associated with a user's private group may take priority over a task associated with the public group only. This results in a user receiving tasks resulting from content the users they have explicitly added to their groups before the tasks resulting from content submitted by users only listed in the public group for that user. Some embodiments may also replace a pending tasks associated with the public group if a task originating from content submitted by a user in one of their private groups becomes available for that user later. The intent is to ensure user's receive tasks resulting from content submitted by users they have selected to exchange content with sooner than from other users.

The system can establish thresholds after which the validity of any remaining tasks resulting from the same user action are invalidated by the system. For example, response and review tasks might be invalidated after a certain number of users have responded, or when the users who have responded to the task have a cumulative knowledge of the topics associated with the task that reaches a certain limit or a certain percentage of the total combined knowledge of all users for those topics. Other methods may invalidate the tasks after a certain amount of time has passed since content that resulted in the task was submitted. This provides a stopping point from which the system can begin the evaluation of the responses that have been received for those tasks and continue to the next step of the process.

The current embodiment distributes tasks to all the users by adding them to the priority queue of each user and allowing the priority queue to control the order in which the user receives the tasks. Using this approach tasks that are well aligned with the user's knowledge are sent early giving a higher chance the user will be able to respond before the task is invalidated by the completion of related tasks by other users. The users will only receive tasks for which they have a lower knowledge level when there are no other tasks for them to receive. Alternatively, an embodiment could be implemented that only distributes tasks to users who have a minimum level of knowledge for one or more of the topics associated with the task. This would be used to reduce the amount of users who have not already established a demonstrated knowledge of the topics associated with the task topics from receiving the task. However, this could also limit potentially valuable answers and votes as well as prevent opportunities for users to establish knowledge for new topics. A particular embodiment might instead use such limitations only when the overall amount of pending tasks yet to be completed is large or large for a given user. In this instance, the embodiment might set some maximum threshold for the number of tasks that each user's priority queue can hold at which point lower priority tasks must be evicted to allow space when a higher priority task becomes available.

An embodiment of the current system may also use alternative methods to prioritize the task distribution. For example, the system could consider the set of topics associated with a user's interest in addition to their knowledge when prioritizing tasks. This may be particularly useful for prioritizing the tasks of new users who have little or no prior established knowledge. By evaluating the user's interest topics the system can provide some level of prioritization to tasks that are more closely related to the topics they have indicated an interest for receiving content about. For an embodiment that allows the users to assign a weighted interest value these weighted values can also be applied to task prioritization.

The system may use predictive analytics or machine learning techniques instead of or in conjunction with the priority queues for prioritizing tasks. The system maintains a record of the knowledge values of each user for the topics associated with the pending tasks and also has full control over the routing and distribution of the tasks to the users. As each user interacts with the system, the system can also maintain historical information concerning the activity of each user, such as how often a particular user responds to certain tasks or tasks pertaining to certain topics. This information can be used to model the system and attempt to predict an optimal distribution of pending tasks to increase overall task response quality and throughput. There are many alternative methods and techniques which can be used for task prioritization, some of which may optimize execution time or space requirements of the system, but the underlying concept is that the user's demonstrated knowledge plays a role in determining the prioritization of the tasks for that user.

An embodiment could allow users submitting questions to include a priority value indicating their perceived urgency for receiving an answer. This value is referred to as a question priority and can be used by the system to prioritize the response and review tasks associated with the question during task prioritization. Such an embodiment might grant a user a certain pool of total question priority having a value from which they can select to deduct some amount to assign to any questions they submit. The system might increase the value of a user's question priority pool in response to that user completing a task as further incentive to participate. This would result in users who complete more tasks receiving a larger pool of question priority they could then apply to their questions in an effort to receive answer sooner. An embodiment might also increase a user's question priority pool amount based on the user's response time to a task. User's who respond to tasks faster would receive a higher amount of question priority added to their pool to incentivize quicker responses and decrease the amount of time it takes to establish the accepted answers.

To attempt to improve overall quality of the selected accepted answers, an embodiment could implement a weighted scoring system giving a greater weight or relative weight to task responses from users with greater knowledge levels of the topics associated with that task. As such, the positive and negative ratings provided through votes from separate users may have a different impact on the acceptance ordering of the answers associated with those reviews depending on the knowledge of the user who submitted them. In addition, an answer may achieve a higher acceptance ordering position compared with other answers even though it may have a lower number of votes or vote values based on the knowledge levels of the users who submitted or reviewed the answers.

To deter users from providing spurious responses to tasks the system can decrease the users knowledge in the topics associated with a task when they submit an answer that is not accepted or submit a vote with a rating that does not align with the majority of the votes received. Some embodiments of the system may also interpret a response to skip a task as a reason to decrease the user's knowledge in the topics associated with that task possibly to a lower degree than providing an unaccepted answer or a minority aligned vote.

Users can create and submit a specific type of content referred to as a post. When a user submits a post they select a group and the system distributes the content to members of that group when one or both of the following conditions is met for the receiving user. The receiving user has added the user submitting the post to the list of users they have chosen to receive posts from, or the receiving user has added one or more of the topics that are associated with the post to their interest and the receiving user was selected by the system to receive the post during the reach distribution process which will be described in a subsequent section. Additionally, the system may provide a user account setting to allow the users to further restrict post content they receive from users they have explicitly chosen to receive posts from to only that content which also contains topics matching their list of interest topics.

When a user receives a post from a separate user, they can also forward or re-post that post to users who have chosen to receive posts from them. When a post is re-posted the user profile for the user who originally submitted the post is maintained along with the post content as it's re-distributed to additional users. In this way, content can be distributed throughout a network. The process of re-posting content is common in existing information sharing platforms. As with other post content the users receiving the re-post content can limit the content they receive to only the content that is associated with a specific set of topics they have in their list of interest topics.

Reach is a value assigned for a given user and topic within a specific group. The actual value of a reach can be obtained using various calculations based on the user's knowledge value, but the result should be that a user's reach associated with a topic remains proportional to the user's knowledge value associated with that same topic. For the purposes of the current embodiment a common percentile calculation will be used where the formula to calculate a user's reach for a given topic is (The number of users with a knowledge less than the given user for the given topic within the group/The total number of users with any knowledge value greater than zero for the given topic within the group)×100. As a user's knowledge associated with the task topics changes based on their responses to the tasks so does that user's reach for those same topics. The reach is then used by the system for a process referred to as reach distribution. During the reach distribution process the system distributes posts, based on the posting users reach value, to users who may or may not have explicitly chosen to receive post content directly from the posting user. For example, after a user submits a post the system evaluates the user's reach for each of the topics associated with that post and applies the following steps. For each topic associated with the post the system evaluates the user's reach associated with that topic and identifies a set of users from the group that the user has selected for the post to be distributed to who have that topic in their list of interest topics. The system then ensures that, while distributing the posts, the number of users with interest in the topic who receive the post correlates positively with the posting user's reach for that topic. For example, if the posting users reach is in the $80^{th}$ percentile for a given topic then the current embodiment randomly selects whether or not each of the users with interest in the topic receives the post during distribution until the percentage of the users who receive the post reaches 80% of the total users with interest in that topic. However, other embodiments could employ different methods in an attempt to better align the selected population with the content, while still maintaining the result that as a user's reach increases the distribution of their post content also increases. As a further example, a different embodiment might compute individual recipient user reach values by taking the submitting user's overall reach values based on all of their knowledge values associated with topics that are also in the recipients interest topics. The individual recipient user reach values can then be used as the basis for building a ranking used to determine which users should receive the post where a larger recipient reach value indicates a higher preference for that user to receive the post. The ranking is then used while distributing the post until the percentage of users who receive the post reaches a level corresponding to the submitting user's reach percentile. If an embodiment allows the users to define weighted values for their topic interest then these weighted values can also be factored into the recipient user reach values for the selection process of the reach distribution. The embodiments described are provided as simple illustrative examples. The knowledge values could also be directly applied to a wide variety of well known and complex recommender systems that use a wide range of known algorithms, statistical rules or machine learning techniques. Using the knowledge values with these methods would also produce the same result where the number of users who receive the post would correlated positively with the submitting user's knowledge values.

With the current embodiment, the reach values for a user are accessible for the user to view as an incentive for the user to increase their values and extend the distribution of their posts. The current embodiment also displays a user's reach along with their user profile with the content they submit so receiving users are aware of that user's reach for given topics. Since the reach corresponds to the user's demonstrated knowledge of those topics the receiving users can use this information to determine the validity of that user's content and for deciding whether to select to receive additional content from a specific user.

An alternative embodiment might use a reach pool associated with a user. The reach pool would operate similarly to the question priority pool in that the user would be able to complete certain actions that would result in an increased amount in their reach pool. The reach pool would be increased based on the same type of actions that increase a user's knowledge. When submitting a post the user can select an amount to deduct from their reach pool to increase the reach for that post. The reach pool could be divided by topic so that user's would build a value in a separate reach pool for each topic and then could apply the reach from a specific reach pool to posts associated with the same topics.

To allow a user to distinguish post content they receive from users they have explicitly selected to receive posts from and content they receive through the reach distribution process, content received through each method may be displayed along with a visual information indicating the particular method that resulting in them receiving the content. Such visual information could include the posting user's user profile along with their reach value and the topic or topics that were used to select the receiving user. By displaying the reach value of the posting user to the receiving user the receiving user gets an understanding of why they received the content as well as an indication of the knowledge level of the posting user which may assist them in determining how they will interpret the content. The receiving user can then decide whether to block the posting user in which case the system will prevent that user from being considered during further the reach distribution processes for posts submitted by the same posting user.

The current embodiment maintains separate reach values for each group, similar to the knowledge values. For example, A user's reach may have a certain value in a private group, but a completely different value in the public group. This prevents users from building reach among a smaller set of users in one group and then applying the reach to a separate and potentially larger group such as the public group in an effort to more widely distribute their post content. Although, the reach values may be maintained separately for each group the system can still use this information across groups for other processes such as task prioritization.

Restricted minor mode is a feature that can be enabled through a user setting which places the user account into a restricted operating mode designed to provide a safer environment for younger users. A user whose settings are configured to operate in restricted minor mode can submit questions to the public group, but only anonymously; meaning their user account is associated with the question for system use, but their user profile is not visible to other users of the system who receive the question. The users operating in restricted minor mode can however, choose whether to include their user profile with questions they submit to any of their private groups. In addition, they can only submit or receive posts and tasks that originate from users within their private groups. Private groups can be built for friends and family as well as verifiable institutions such as schools and other organizations. Since answers provided for all questions are required to be accepted through the a majority of votes received from the review tasks the potential for inappropriate content being returned to a user operating in restricted minor mode is limited based on the fact that it will likely be rejected during the voting process by other users who are reviewing the answer. To assist the users who are responding to tasks with determining how to answer a question or whether an answer should be rejected as inappropriate, the tasks generated in response to questions submitted by users operating in restricted minor mode may include an indication of such. These settings allow a user operating in restricted minor mode to benefit from a large community of users who can provide answers to their questions while using the review process to prevent arbitrary responses and limiting the ability for direct communication with users outside of their own private groups.

Certain attributes of a user account may be used to verify the user's affiliation with an organization that is considered to be a trusted source of knowledge for a given domain. An example would be a user account associated with an email address that contains a host domain belonging to a professional organization such as a university, medical or scientific institution, or government agency. When a user creates a user account that includes such identifying information that user account can be verified through a confirmation email and response. Such verifiable affiliations could also be used by an embodiment of the system to provide additional knowledge value to a user for topics associated with the those establishments. In addition, the system could label responses to tasks from such users with visual indicators allowing users who receive answers or reviews from those users to see their affiliations.

The current embodiment provides a user interface for operating the client components. The user interface can be implemented using existing techniques available for a variety of target platforms such as native mobile applications or browser based applications. The user interface is comprised of several separate views. Some of these views have a scrollable list that contains an individual display element for each separate content along with associated information such as user profile and reach values. This content can include any combination of one or more of text, images, document file attachments, and audio and video all contained within an element of the list. List elements containing audio and video content include an appropriate player for the type of media associated with that content. Each list of elements is scrollable allowing the user to navigate through a collection of content. Such lists of elements are typical in similar platforms and are used to scroll through a list of content created or received over time. In the current embodiment, there are three separate views with each containing different types of content. There is a separate view containing posts the user has submitted or received, answers the user has received as response tasks, and the questions and answers that the user has received as review tasks. This design is meant to organize the information for the user, but different embodiments could implement different designs such as a single view with one list containing the content of all types. The current embodiment orders the list of elements based on the submission time of the content with the most recent content being at the top of the list, but different embodiments can use different orderings. Content associated with a pending response or review task includes is located as the first element of the corresponding list and includes visual differences such as a differently colored background of the element indicating to the user that the task is still currently pending. Each visual element may also include the user profile information for the user account of the user who submitted the content. In addition to the user profile the user's reach for the topics associated with the content or an average value of their reach for all the topics can also be displayed along with the content which they provide or review.

The user creates content by typing text, capturing media on a device, or attaching files from a file system. After the user creates new content they can see the content contained in a new element displayed through the user interface and decide whether to submit that content. The user interface of the current embodiment notifies users when a new task is received by displaying a visual notification indicating which view and list of elements has new content or a pending task as each is received. With the current embodiment the user receives a single task at a time and no further tasks are sent until a response is submitted for the current pending task. For either task type the user is provided the option to skip that task freeing them to receive the next task from the system.

When a user submits a question and receives an answer that answer can either be provided anonymously or include the user profile of the user who answered the question. If the answering user chooses to include their user profile with the answer then the user receiving the answer can view the user profile and see a variety of information associated with the responding user. However, even if the user choose to answer anonymously, the system can still display the answering users reach value associated with the topics of the question and answer for the receiving user to view. This gives the user receiving the answer a gauge of the answering user's knowledge level for those topics. For instance, when receiving an answer the receiving user might see that the user who answered their question was in the $80^{th}$ percentile for one topic and the $70^{th}$ percentile for another topic associated with their question. Instead of showing the answering user's individual reach values for each topic, content may include some central tendency such as the average of the reach values for all the topics associated with the question and answer. Similar summaries for the individual or overall knowledge levels may be provided for the users who submitted the reviews for the answer. For instance, the answer might include information indicating that the average knowledge of the users reviewing the answer was in the $85^{th}$ percentile for one topic and the $75^{th}$ percentile for another topic. The reach of reviewing users can also be summarized over all topics so the receiving user sees the overall knowledge percentile for all topics. An example would be, an answer displaying information stating that the answer was submitted by a user with an average reach for all the topics in the $80^{th}$ percentile and reviewed by users with the average reach for all topics in the $75^{th}$ percentile. With such a summarized view, the user interface might allow the user to click on either the response or review reach percentiles to view more specific details of the reach values associated with the individual topics or responding and reviewing users. This helps the users who receive the answers to determine how to interpret the accuracy of the answers and ratings as well as an opportunity to discover other users who they may then select to receive posts from out of the users who have chosen to provide user account information.

When one or more answers for a question that a user submits are accepted, the answer or answers are distributed to that user and displayed within the element that contained their original question in the list of elements. This allows for answers to a user's questions to be associated with the question in the list. The views that contain the lists of elements for the response and review tasks also use visual information such as the background color of the element to allow the user to see if their submitted answer was accepted or if their vote was aligned with the majority. This is determined when the system evaluates the votes and then the results are distributed to the client components which in turn update the individual elements accordingly.

Users are provided a view which allows them to search for other users by user name and select to add them to a list of users which they receive posts from. Individual lists can be defined for a particular group such as the public group or a private group to help organize the lists and the content the user receives for each group. An alternative method of adding users to this list includes selecting the user profile of a user associated with content they've received and selecting to add that user. The user also has a view of the users that have selected to receive posts from them. The user can define private groups by selecting to add or remove the users from this list. When creating a private group the user can assign the private group a name that is meaningful to them for that collection of users. The current embodiment includes a label for each list element which identifies the group that the content is associated with. When creating a new post the user can change the value of this label to the public group or any of their private groups. This allows the user to indicate that when the new post is submitted it should be distributed to the users of the selected group only.

Users have the choice to submit content anonymously, but many devices that the client components could run on such as a phone might make it difficult to record media with audio and no video. For instances when a user would like to submit content that includes video anonymously the system can obfuscate the video using different methods. One method would be to replace the submitted video with an existing video or animation while still playing the original audio. This allows a question or answer to be submitted without revealing user information. Another approach would be to use a character graphic commonly referred to as an avatar which is a type of graphic overlay that tracks and mimics a users gestures. The second approach might allow the user to relay facial and body language without revealing identifying information. Avatars and overlay features are commonly used for entertainment with existing social platforms. Similar obfuscation methods can be applied to change some audible characteristics of the content such as the pitch and tone of voices. Any or all of these methods could be applied automatically to any questions posted to the public group by users operating in minor mode.

The invention claimed is:

1. A computer-implemented method for determining a distribution of digital information within a network comprising:
   (a) providing an interface allowing users to submit and receive digital information relating to questions, answers, and posts, wherein an answer provides a response to a question establishing an association between the answer and the question and a post is information not inherently associated with the questions or the answers;
   (b) associating knowledge values with the users, each of the knowledge values being associated with one of the users and a topic, the knowledge values used to represent the associated user's level of understanding of the associated topic, wherein each user can be associated with one or more knowledge values;
   (c) receiving one or more evaluations, each of the evaluations submitted by one of the users for one of the answers, the evaluations used to represent the submitting user's rating of the evaluated answer with respect to the evaluated answer's associated question;
   (d) aggregating a plurality of the evaluations that were submitted for the same answer by different users to derive an overall evaluation of that answer;
   (e) increasing one or more of the knowledge values, wherein each of the knowledge values being increased is associated with a user who submitted a favorable evaluation for one of the answers and the overall evaluation of the same answer is also favorable; and
   (f) distributing the posts, based on maintaining a positive correlation for each of the posts between the aggregate value of one or more of the knowledge values associated with the user who submitted the post and the number of users who receive the post.

2. The method of claim 1, further comprising:
   associating the questions with topics, each question associated with one or more topics, the topics associated with each question being determined by the question's content and, wherein each of the knowledge values being increased in step (e) are associated with a topic and the question associated with the evaluated answer is associated with the same topic.

3. The method of claim 1, further comprising:
increasing one or more of the knowledge values associated with users who submit an answer, wherein the overall evaluation of the answer submitted by the user is favorable.

4. The method of claim 3, further comprising:
associating the questions with topics, each question associated with one or more topics, the topics associated with each question being determined by the question's content and, wherein each of the knowledge values associated with users who submit an answer being increased are associated with a topic and the question associated with the submitted answer is associated with the same topic.

5. The method of claim 1, further comprising:
associating the posts with topics, each post associated with one or more topics, the topics associated with each post being determined by the post's content, and wherein each of the knowledge values being aggregated in step (f) are associated with a topic and the submitted post is associated with the same topic.

6. The method of claim 1, further comprising:
associating the users with topics, each user associated with one or more topics, each topic used to indicate that the user is interested in receiving questions, answers, and posts that are associated with the topic, and wherein one or more of the knowledge values being aggregated in step (f) are associated with topics and the receiving users are associated with the same topics.

7. A computer server used for the distribution of digital information within a network comprising:
one or more processors; and
a non-transitory computer-readable medium including instructions that, when executed by one or more processors, cause the one or more processors to perform operations including:
(a) providing an interface allowing users to submit and receive digital information relating to questions, answers, and posts, wherein an answer provides a response to a question establishing an association between the answer and the question and a post is information not inherently associated with the questions or the answers;
(b) associating knowledge values with the users, each of the knowledge values being associated with one of the users and a topic, the knowledge values used to represent the associated user's level of understanding of the associated topic, wherein each user can be associated with one or more knowledge values;
(c) receiving one or more evaluations, each of the evaluations submitted by one of the users for one of the answers, the evaluations used to represent the submitting user's rating of the evaluated answer with respect to the evaluated answer's associated question;
(d) aggregating a plurality of the evaluations that were submitted for the same answer by different users to derive an overall evaluation of that answer;
(e) increasing one or more of the knowledge values, wherein each of the knowledge values being increased is associated with a user who submitted a favorable evaluation for one of the answers and the overall evaluation of the same answer is also favorable; and
(f) distributing the posts, based on maintaining a positive correlation for each of the posts between the aggregate value of one or more of the knowledge values associated with the user who submitted the post and the number of users who receive the post.

8. The computer server of claim 7, a non-transitory computer-readable medium including instructions that, when executed by one or more processors, cause the one or more processors to perform operations including:
associating the questions with topics, each question associated with one or more topics, the topics associated with each question being determined by the question's content and, wherein each of the knowledge values being increased in step (e) are associated with a topic and the question associated with the evaluated answer is associated with the same topic.

9. The computer server of claim 7, a non-transitory computer-readable medium including instructions that, when executed by one or more processors, cause the one or more processors to perform operations including:
increasing one or more of the knowledge values associated with users who submit an answer, wherein the overall evaluation of the answer submitted by the user is favorable.

10. : The computer server of claim 9, a non-transitory computer-readable medium including instructions that, when executed by one or more processors, cause the one or more processors to perform operations including:
associating the questions with topics, each question associated with one or more topics, the topics associated with each question being determined by the question's content and, wherein each of the knowledge values associated with users who submit an answer being increased are associated with a topic and the question associated with the submitted answer is associated with the same topic.

11. The computer server of claim 7, a non-transitory computer-readable medium including instructions that, when executed by one or more processors, cause the one or more processors to perform operations including:
associating the posts with topics, each post associated with one or more topics, the topics associated with each post being determined by the post's content, and wherein each of the knowledge values being aggregated in step (f) are associated with a topic and the submitted post is associated with the same topic.

12. The computer server of claim 7, further comprising:
associating the users with topics, each user associated with one or more topics, each topic used to indicate that the user is interested in receiving questions, answers, and posts that are associated with the topic, and wherein one or more of the knowledge values being aggregated in step (f) are associated with topics and the receiving users are associated with the same topics.

* * * * *